Aug. 16, 1955     T. D. BOWES     2,715,663
CENTRIFUGAL CIRCUIT CONTROLLER
Filed Nov. 4, 1953     2 Sheets-Sheet 1
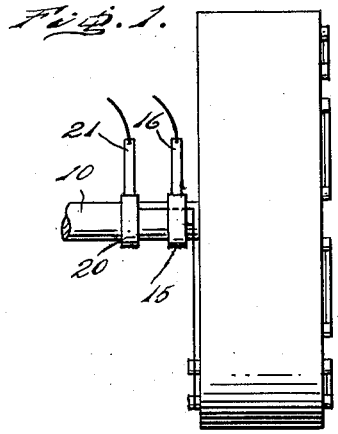
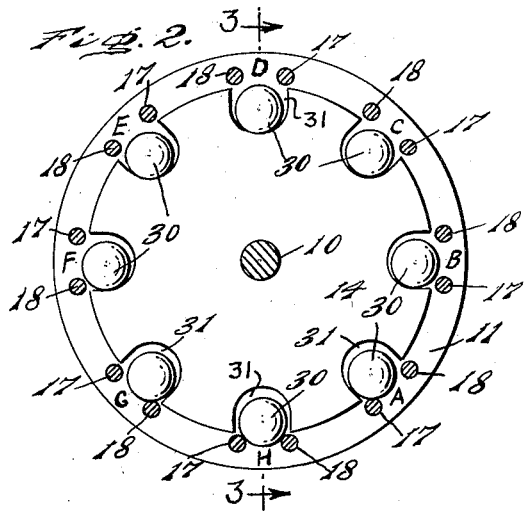
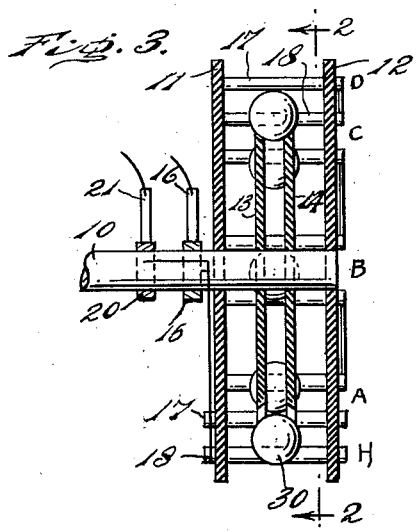
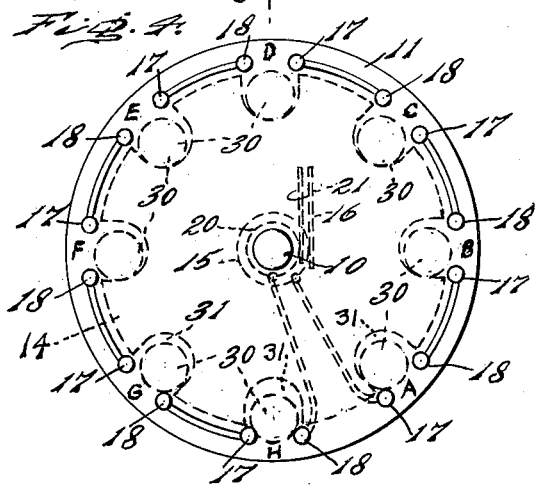
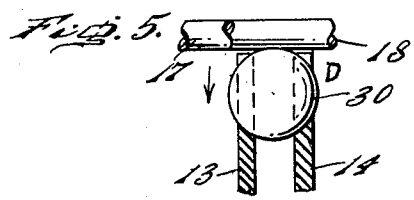
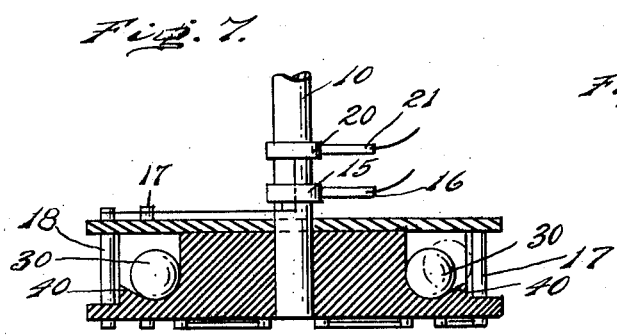
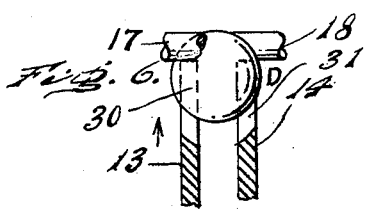
INVENTOR
*Thomas D. Bowes*
BY *Frank H. Borden*
ATTORNEY Aug. 16, 1955     T. D. BOWES     2,715,663
CENTRIFUGAL CIRCUIT CONTROLLER
Filed Nov. 4, 1953     2 Sheets-Sheet 2
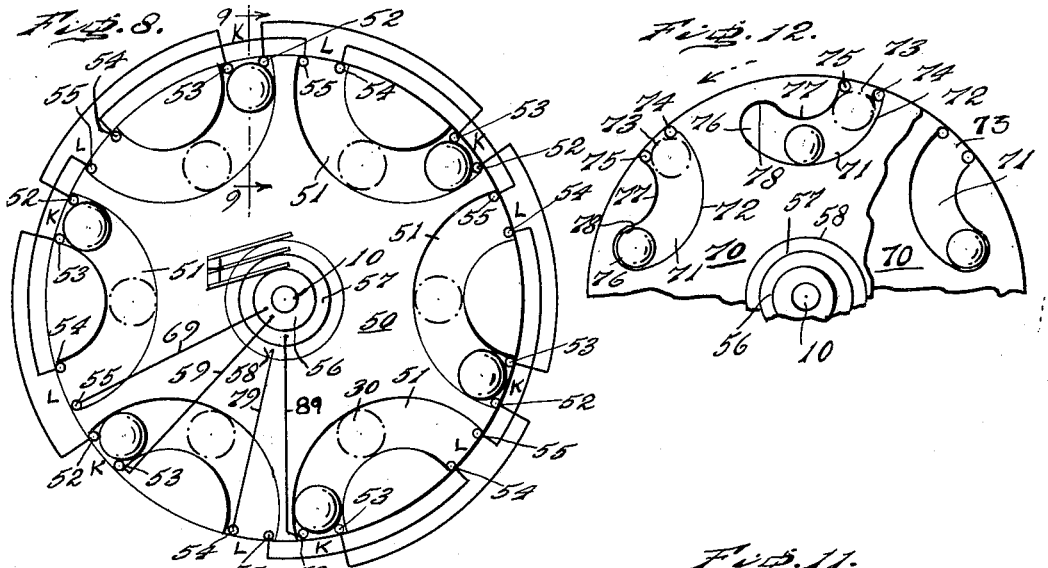
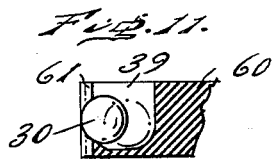
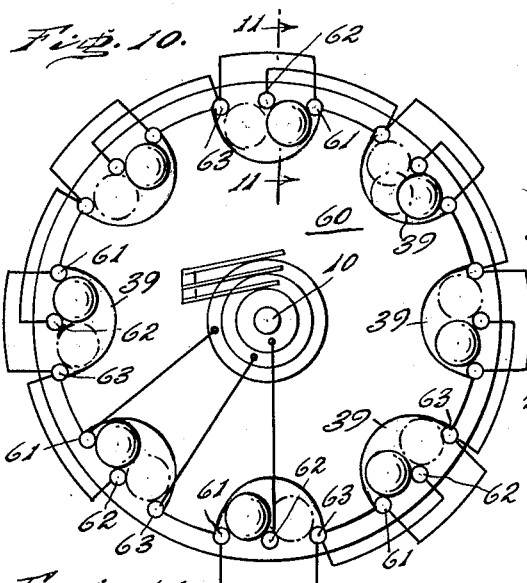
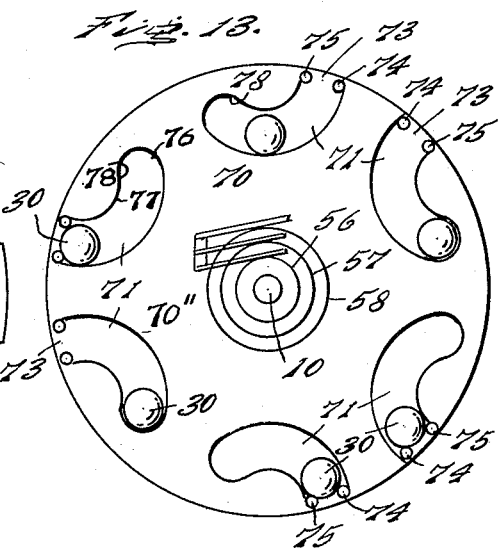
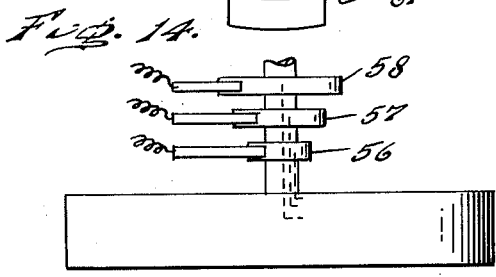
INVENTOR
*Thomas D. Bowes*
BY
*Frank H. Borden*
ATTORNEY.

United States Patent Office 2,715,663
Patented Aug. 16, 1955

2,715,663

CENTRIFUGAL CIRCUIT CONTROLLER

Thomas D. Bowes, Bala-Cynwyd, Pa.

Application November 4, 1953, Serial No. 390,153

6 Claims. (Cl. 200—80)

This invention relates to centrifugal circuit controllers.

There are many situations in which it is desired to control a circuit in response to the existence and maintenance or termination of angular motion of some part subject to such motion. An illustrative utilization of such circuit controller is found in connection with an angular motion controller, comprising the subject matter of my application Serial No. 383,867, filed October 2, 1953, upon which, among other uses, the instant invention is an improvement.

In said application an electric system is provided for securing the controlled rotation of a receiver shaft running in angular motion as a time function of the rotation, or movement in angular motion, of a transmitter shaft. A typical important, but purely illustrative use of the said invention is in the steering of a ship or vessel, in which a steering wheel or like angularly movable element selectively actuates motor-regulating relays and continuing to run the motor as long as the wheel continues to be turned above a given minimum rotational rate, and through the motor running to turn a rudder stock in a selected direction. Although various devices are used responsive to the rotation of the steering wheel for controlling the relays of said application, one device is a governor-type of circuit controller in which fly-weights responsive to centrifugal force control the circuit. The device, while thoroughly operative for the desired results, had certain disadvantages, in the fact that the make-and-break always occurred at the same points and with arcing, pitting, and the like, corrosive effects interpose or build up unpredictable resistance, which is undesirable.

It is among the objects of this invention to provide a centrifugal circuit-controller which is substantially self-cleaning, and so maintains the same degree of efficiency during its useful life; to provide a centrifugal circuit-controller of simplicity and extreme economy of manufacture; to provide a centrifugal circuit-controller of general utility in the arts; to provide a circuit-controller utilizing a plurality of individual centrifugally controlled partial circuit-controllers in a series circuit, requiring closing of all of the plurality to complete the total circuit; and to provide other objects and advantages as will become more apparent as the description proceeds.

In the accompanying drawings forming part of this disclosure:

Fig. 1 represents a diagrammatic side elevation of a centrifugal circuit-controller according to the invention.

Fig. 2 represents a diametrical section therethrough with the shaft in a condition of rest showing a plurality of partial circuit controllers with some gravitationally making contact, while others gravitationally are held out of contact maintaining an open total circuit, controlled by the device as taken on line 2—2 of Fig. 3.

Fig. 3 represents an axial section through the device as taken on line 3—3 of Fig. 2 with the outer housing surface removed.

Fig. 4 represents a diagrammatic section generally diametrical of the device to show the circuit connections thereof.

Fig. 5 represents an illustrative fragmentary section through one partial circuit controller of the device, with the bridging ball out of contact with the circuit-carrying rods, under gravitational bias.

Fig. 6 represents a similar fragmentary section with the bridging ball engaging the circuit-carrying rods under a centrifugal component greater than the gravitational bias.

Fig. 7 represents a diagrammatic section through a modified form of device in which the axis of the drive shaft is disposed vertically.

Fig. 8 represents a transverse elevation, partially in schematic section and also partially in diagrammatic form, of a modified form of the invention, in which the gravitationally-centered balls on arcuate tracks respond by inertia, to follow the track in one sense or the other to close partial circuits of a complete circuit selected by the direction of rotation of the device and the corresponding sense of ball movement.

Fig. 9 represents a fragmentary section through one of the ball tracks of Fig. 8, taken on line 9—9 of Fig. 8, showing the slope for the gravitational movement of the ball to a centered position.

Fig. 10 represents a transverse elevation, partially in schematic section and partially in diagrammatic form, of a still further modified form of the invention.

Fig. 11 represents a fragmentary section through one of the ball pockets of Fig. 10, on line 11—11 thereof, showing the slope of the floor thereof.

Fig. 12 represents a fragmentary section, partially in elevation, of a modified form of the invention in which two decks or levels are used, whereby the balls can only move into bridging partial circuit-closing relation with movement of the mounting device in one sense, in one part or deck of the organization, while the associated part of the organization permits the balls to move into circuit closing relation only with movement of the mounting device in the other sense.

Fig. 13 represents an elevation of a still further modified form of the invention in which the partial circuit closures of one circuit can be closed by rotation in one sense, while the partial circuit closures of the other circuit can be closed by rotation in the other sense.

Fig. 14 represents a diagrammatic side elevation of the device incorporating the features of Figs. 8 to 13 inclusive.

In essence the invention comprises plural partial circuit controllers, with each comprising a pair of circuit-conducting rods and a complemental bridging element, with circuit connections such that all of the bridging elements must be in engagement with all of the respective pairs of rods in order to complete the circuit, and so arranged that angular motion of the driven shaft at a given minimum speed causes closing of all of the individual partial circuit controllers and completion of the circuit, whereas shaft motion below the minimum speed, or stoppage of the shaft causes one or more of the bridging elements to drop out of circuit-making engagement with its rods to interrupt the total circuit.

In carrying out the invention in one illustrative embodiment, a generally horizontally disposed shaft 10 is provided, mounting a pair of rod-supporting elements, and a pair of bridging element supports. Illustratively, these comprise a plurality of discs of insulating material, namely rod-supporting outer discs respectively 11 and 12, keyed to the shaft for rotation therewith, and which may comprise legs of an enclosing housing, if desired, and inner discs of smaller diameter than the discs 11 and 12, comprising peripherally notched discs 13 and 14, also mounted on the shaft for rotation therewith.

It will be understood that the numbers of rods and complemental bridging elements used as partial circuit controllers will vary according to the necessities of a given installation. In its simplest essence the desired circuit control can be effected with a simple plurality of two such organizations. It may be difficult to insure gravitational disruption of the circuit in a horizontal shaft disposition, although perfectly adapted for vertical shaft disposition as shown in Fig. 7, to be described. For illustrative purposes, however, and to effect the result with certainty that at least one bridging element will drop gravitationally out of bridging relation when the centrifugal component reduces below the minimum, or stops, no matter what the angular position of the horizontal shaft may be at that moment, it is preferred to provide eight of such bridging units or organizations. To avoid repetition, these will be identified as partial circuit controllers A to H, inclusive.

In order to illustrate the circuit in one organization thereof, reference may be made to Fig. 4. The shaft insulatedly mounts a first slip ring unit 15, constantly engaged and wiped by a fixed brush 16, connected to one side of the circuit to be controlled. This slip ring is in electrical engagement with a terminal rod 17 of a first pair of insulated rods 17 and 18 of partial circuit-controller A, rigidly mounted on the outer discs 11 and 12, generally parallel to the axis of the shaft 10. The shaft 10 also mounts a second slip ring 20, in insulated relation, constantly engaged and wiped by a brush 21, for the other connection to the circuit to be controlled. Ring 20, for convenience, in Fig. 4 is indicated as of a diameter different from that of slip ring 15, simply to show both in end elevation. Of course, actually the rings will be similar in dimensions. For simplicity, the rods of each pair for all of the partial circuit-controllers will be designated as 17 and 18. The rods are disposed in general parallelism with the axis of shaft 10 and are disposed in arcuate alignment concentric with said axis. The spacing in the arcuate series is preferably a little greater between contiguous rods of adjacent pairs than between the rods of a pair, although this is not important.

Ring 20 is in electrical connection with terminal rod 18 of the pair of rods 17 and 18 of circuit controller H. Partial circuit controllers A and H have terminal rods disconnected from all others, except by the bridging elements to be described, whereas rod 18 of controller A is in electrical connection with rod 17 of the controller B; rod 18 of controller C is in electrical connection with rod 17 of controller D, and so on, until H is reached, in which its rod 17 is in electrical connection with rod 18 preceding switch unit G.

In the preferred embodiment of the invention the bridging element is circular, as a short cylinder or rod, but it is preferably spherical. For general purposes, therefore, it will be designated as a ball. Each partial circuit-making component or unit of the assembly comprises a pair of spaced parallel rods 17 and 18 and a bridging ball 30. Each ball is mounted in a pocket 31 formed by complemental sockets in the discs 13 and 14, so shaped as to receive and anchor the ball 30 against any but limited movement either axial or radial of the shaft, with the radial movement just enough to permit the ball to move out of bridging engagement with its spaced rods as indicated in Fig. 5, and so as to generally guide it toward the rods when the centrifugal component attains sufficient magnitude to effect this result against the gravitational bias component, as indicated in Fig. 6.

In operation, assuming that the generally horizontal shaft is stationary, in the particular attitude indicated in Figs. 2 and 4, the gravitational bias has closed the partial circuit through H at least, and possibly through A, B, F and G, although, as shown, H is the only component closing its partial circuit. As disclosed, the gravitational bias has forced open the circuit through all other switches.

Obviously, the complete circuit remains open. As torque is applied to the shaft 10 and the shaft begins to rotate and to accelerate, at some point all of the balls will have been flung out centrifugally and the complete circuit from one side of the line through the slip ring 15 to terminal rod 17 of component A, through all of the rods to the terminal rod 18 of component or switch H to slip ring 20 will be completed. As the shaft 10 slows down and the centrifugal component decreases it will eventually attain such small amplitude that gravity will cause a ball or balls to drop out of rod-bridging relation and open the circuit.

Although it is recognized that the substantial point contact between any ball and its complemental rods imposes a fairly high resistance factor, this can be compensated for in the circuit, whereas the variable resistance arising from corrosive effects of an arc formed by breaking the circuits at the same points is definite but unpredictable, and the tumbling action of the balls in their movements effects slight rotations to the balls which presents new points of contact which render the switches in effect self-cleaning, minimizing the resistance and sticking effects of corrosion due to arcing and providing new surfaces of contact on substantially each circuit-controlling operation.

Because of questions of dynamic and static balance of the circuit controller, as it may affect some instrumentality associated with the application of torque to the shaft 10, it will be seen that the preferred form of the device, utilizing a horizontal shaft, may impose problems that would be obviated or minimized if the balls shifted their positions substantially simultaneously. For this purpose, as well as for general utility in the art, the modification of Fig. 7 may be resorted to. In this case, the organization is substantially similar, except that the shaft is vertical, and the pocket organization of the ball-supporting discs is modified to provide a sloping surface 40 leading between the pair of rods downwardly and radially inwardly. In this situation centrifugal force causes all of the balls substantially simultaneously to travel outwardly upwardly of the sloping surfaces 40 to make contact with the pair of rods of the particular components. In this way substantially simultaneously all of the balls engage their respective complemental rods to complete the circuit. Whenever the radial component of centrifugal force decreases below that necessary to hold the balls in such contact the gravitational component causes each ball to travel downwardly on slope 40 and to break the previously established circuit-making contact with its rods. It will be appreciated that although the circuit-breaking bias has been illustrated as gravitational, other forms of bias may be utilized whether electrical or mechanical, without modifying the principles of the device.

It will be seen of the types of device as so far described that the circuit closure controls but one complete circuit regardless of the direction of rotation, and that, consequently, supplemental switching means must be used in series with the single circuit of the centrifugal device, to select and distinguish a circuit controlled with one sense of rotation and that controlled by the opposite sense of rotation. In the illustrative utilization in connection with the invention of said pending application, the supplemental switching means was actuated by a friction clutch or the like, selectively controlled in circuit selection by the rotation of the shaft mounting the governor, and this is perfectly satisfactory. However, it introduces additional make-and-break devices and adds to the complication of the assembly. It is a feature of this invention to provide a centrifugal circuit controller operative for both selecting the main circuit of two such circuits to be controlled, and for closing or opening the selected circuit, in accordance with the sense of rotation of the controller and its cessation.

One form of the device for accomplishing this highly important and desirable result is shown in Fig. 8. Referring to this figure, which, as noted, is semi-diagrammatic and schematic, the shaft 10, in a vertical position mounts an insulating support 50, having a plurality of generally arcuate ball tracks or paths 51, leading, at one end, K, toward the periphery of the support to a pair of spaced contact-making parallel bars 52 and 53, and at the other end, L, toward the periphery of the support to a pair of spaced contact-making parallel bars 54 and 55, with the ends K and L of each ball track peripherally spaced.

The contact-making bars 52, 53, 54 and 55 are generally parallel to the axis of the shaft 10, as in the other forms of the invention. The arcuate paths 51 slope inwardly out of a plane diametrical of the axis of the shaft, being sloping upwardly radially outwardly adjacent the terminal ends K and L respectively, as shown in Fig. 9, and having the intermediate, generally arcuate center area sloped downwardly radially inwardly so that the contact-making elements, such as the balls 30, by gravity move out of contact-making engagement with any given pair of rods, and generally into the center of each path or track, when the shaft 10 is brought to a standstill.

In an illustrative form of wiring of this form of the device, proceeding counterclockwise, rod 55 of the L end of one path connects by a common return line 69 to a slip ring 56. Rod 53 of the K end of the next adjacent path by a lead 59 connects to the same common return through slip ring organization 56. Rod 54 of the L end of the last mentioned path, through connector 79 and slip ring organization 58 connects with one side of one of the two circuits being controlled. Rod 52 of the K end of the next adjacent path through connector 39 and slip ring 57 connects to one side of the other of the two circuits being controlled. Aside from these identified terminal rods, all rods 55 of the L end of the paths are electrically connected to the rods 54 at the L ends of adjacent paths, and the rods 53 of the K ends are electrically connected with the rod 52 of the K ends of the adjacent paths.

In operation, with the circuit-controller shaft in a stationary condition with its shaft vertical, gravity causes all of the balls 30 to move out of contact with any bars or rods, and to assume a position substantially centered in the respective arcuate paths in which they are confined and guided. Upon the initiation of rotation of the shaft, and its acceleration as it is brought up to speed, the inertia of the respective balls cause them to move out of the centered lower position, toward the end of the path determined by the instant direction or sense of rotation, and as centrifugal force develops it forces all of the balls up the appropriate slope at K or L and against the rods or bars at the end thereof to which it has been forced. It will be clear that in each organization of path and ball, the ball will be relatively moved in the same end on each path, and the thus selected circuit will be made, as will be clear. Reversal of the shaft rotation after a stoppage and re-centering of the respective balls will fling the respective balls to the other ends of their paths, with both a selection and a closing of the alternate circuit provided.

It will be seen that in the form of device of Fig. 8, there are plural rods at both ends of the path, so that four rods are required for each path. A simplification of this organization is shown in Fig. 10, in which the paths control the circuits with three rods, one of which is common to both circuits.

Referring to Fig. 10, the shaft 10 mounts a support 60 of insulating material, the outer periphery of which is formed with a plurality of generally arcuate pockets 39 having radially sloping floors, and the outer portion of the pockets each mounts contact-making rods 61, 62, and 63, of which the central rod 62 is common to both circuits. Contact-making rods 61 and 63 of each pocket 39 are bridged by an electrical connection, except the one shown at the immediate left on the lowermost pocket, and end rod 63 of one pocket is connected electrically to central rod 62 of the next adjacent pocket for all except the lowermost pocket. The lowermost pocket illustrated does not have any connection between its central rod 62 and any rod 63, but is a terminal rod connected to the common lead of both circuits through appropriate slip rings or like connections as have been described of Fig. 8.

Rod 63, of the next to the bottom pocket, is a terminal rod connected through slip ring connections to a line of one circuit, while terminal rod 61 thereof is connected to the line of the alternate circuit, controlled by the device. The operation is similar to that of Fig. 8, except it will be seen that the central rod 62 of each pocket is engaged in both circuit-making ball positions, and the ball motions are shorter.

It will be understood that the principle of utilization of the inertia of the contact-making element to control its circuit-controlling functions can be utilized in other forms of devices. As shown in Figs. 12 and 13 in fragmentary form, advantage can be taken of pockets which are asymmetrical, so that a single pair of contact-making rods at the open side of the pocket are engaged by the ball in one sense of rotation of the device, while being held against any circuit closing in the opposite sense of rotation of the device. The structure and functioning will be clear from a description of one pocket. The mounting plate 70 has a pocket 71 of generally kidney-shaped profile, one edge of which is generally arcuate, as at 72, leading to a mouth 73 generally radial of the axis of rotation of the support 70, generally bisecting a pair of contact-making rods 74 and 75. The generally arcuate wall 72 merges into a curved wall generally circumferential of the support generally perpendicular to the radius bisecting the mouth of the pocket in one direction or the other, as will be pointed out. The curved wall leads into a pocket recess 76, having a defining wall portion 77 curved radially outward at the recess to form a ball holding recess 78. It will be seen that the ball 30 in one position under centrifugal force engages and bridges the rods 74 and 75, while in the other position under centrifugal force the ball is engaged and held in the ball recess 78. A plurality of the kidney or like shaped pockets 71 may be utilized to effect control of alternate circuits in either of two illustrative organizations.

In one organization as shown in Fig. 12, the circuit controller is of two decks or levels, one of said levels being identified as 70, in which all of the pockets 71 are similarly presenting in one related organization, in which engagement of all of the respective balls with the rods in response to rotation in one direction control and complete one circuit, while rotation in the other sense finds one or more balls out of engagement with its circuit completing rods to break the circuit. The other level is identified as 70', in which the pockets 71 are similarly presenting in a related organization, but opposite to the pockets of the other deck, in which engagement of all of the respective balls with the rods in response to rotation in the other direction control and complete the alternate circuit, while rotation to complete the circuit of the first deck finds one or more balls out of bridging engagement to complete the interruption of said alternate circuit. The wiring of this type of organization for the desired results will be obvious, as the rods 74 and 75 of each deck are so coupled that bridging by all of the balls of one deck completes the total circuit.

As shown in Fig. 13, a modified form of circuit controller is provided using the kidney-shaped pockets 71 in a support 70''. In this arrangement alternate pockets are directed opposite circumferentially of the support, with those presenting or directed in the same direction coupled to complete one circuit when all of its respective balls engage with their respective rods in response to one sense of rotation, while all of the alternate pockets are simultaneously prevented from completing their circuit, and in which the said alternate pockets presenting in the same direction opposite to the first presentation respond to rotation in the other direction to complete the circuit which they control.

If it is desired to use either of these organizations, Fig. 12 or Fig. 13, on a vertical shaft, the floors of the pockets are sloping to cause gravitational withdrawal of the balls from engagement with their associated rods, toward the pocket recess 78. With such initial disposition of the balls with a stationary device it will be seen that through inertia of the balls, the start of rotation of the device will cause those balls which can move into the pocket recesses, by reason of the disposition of the pockets, to so move, and the developing centrifugal force simply holds them against the wall 77 in recess 78. On the other hand, those balls which through inertia move from the gravitationally attained position in the pockets toward the mouths of the pockets, by centrifugal force engage and close the circuit effective through bridging of all of the rods of those pockets.

This phase of the invention has a further advantage, possibly not attaching to the forms of invention of Figs. 8 and 10, in that it permits the use of a horizontal shaft. With this disposition with the supports 70, 70' or 70" in a vertical attitude, it is not necessary to have any slope of the floor of the pockets, which may therefore lie in a plane diametric of the axis of the shaft. With plural pockets, after a circuit-closing actuation of the device, no matter where the device cames to rest, it will be apparent that some one or more of the balls of each set of pockets will have dropped gravitationally out of circuit-making engagements with its set of rods, so that although some may retain the circuit-closing engagement, the complete circuit is open. The subsequent movement of a ball of one set out of the open contact position in the pocket recesses 78 will be a function of the sense of rotation as to whether it remains in the recess or moves out of this and into position to be moved by centrifugal force against its circuit-making rods to establish with the already partial circuits, the complete circuit desired.

It is believed that the advantages of the invention will be apparent, as will the fact that various changes in and modifications of the illustrative disclosures may be made without departing from the spirit of the invention, and such are to be construed as within the scope of the invention as set forth. In this connection the bars or rods mentioned may be other circuit members comprising stampings or the like, for instance, and they need not either be linear nor parallel so long as the desired function is achieved. Relatedly, although for simplicity a ball is preferred, the bridging member may be angular, and may comprise a fluid conductor, such, for instance, as mercury, so long as its desired function is achieved.

Having thus described my invention, I claim:

1. A centrifugal circuit controller comprising a pair of circuit members of one circuit, a pair of circuit members of a second circuit, means rotatable about a substantially vertical axis mounting the respective pairs, a movable bridging member, means guiding the bridging member in a path between the first mentioned and the second mentioned pairs of circuit members, means biasing said member to a neutral unbridging position relative to both pairs of members when the means rotatable is stationary, said bridging member responsive to predetermined rotation and the direction of rotation of said mounting means to move toward one of said pairs, said bridging member responsive to centrifugal force to engage and bridge the pair of members toward which it has moved.

2. A centrifugal circuit controller comprising a rotatable device rotatable on a substantially vertical axis, a pair of circuit members of one circuit mounted on said device, a pair of circuit members of another circuit mounted on said device, bridging means mounted loosely on said device and responsive to predetermined movement of the device in rotation after being stationary to move said bridging means toward one of said pairs to a position at which centrifugal force urges it toward said pair to bridge said pair in a circuit-closing action, means on the device for guiding said bridging means between said respective pairs, and means for moving said bridging means on said path out of circuit-closing action when the device has stopped after having been predeterminedly moved.

3. A centrifugal circuit controller comprising a device rotatable in either direction about a vertical axis, means establishing a generally arcuate path on said device the extremities of which are generally radial of said axis, a pair of circuit members in spaced relation at both ends of said path, a rotatable bridging member mounted on said path, means biasing the bridging member toward a generally intermediate position relative to the respective pairs of circuit means and out of contact with either, said rotatable bridging member responding through inertia to movement of said device to move toward a selected pair of said members on said path and responsive to a component of centrifugal force to engage and bridge said selected pair of members.

4. A reversible centrifugal circuit controller comprising a rotatable device rotatable about a substantially vertical axis, a first pair of circuit members of one circuit mounted on the device, a second pair of circuit members of another circuit mounted on the device, guiding means on said device leading between both pairs, bridging means mounted loosely on said device in substantial engagement with said guiding means and responsive to predetermined movement of the device in rotation after being stationary to move said bridging means along said guiding means toward a selected pair of circuit members through inertia to a position at which centrifugal force moves the bridging means toward said selected pair to bridge said selected pair in a circuit-closing action, and means for opening said selected circuit and moving said bridging means along said guiding means away from said selected pair of circuit members to a neutral position when rotation of said device terminates.

5. A reversible centrifugal circuit controller comprising a rotatable device rotatable about a substantially vertical axis, a first pair of circuit members of one circuit mounted on the device, a second pair of circuit members of another circuit mounted on the device, guiding means on said device leading between both pairs, bridging means mounted loosely on said device in substantial engagement with said guiding means and responsive to predetermined movement of the device in rotation after being stationary to move said bridging means along said guiding means toward a selected pair of circuit members through inertia to a position at which centrifugal force moves the bridging means toward said selected pair to bridge said selected pair in a circuit-closing action, and means for opening said selected circuit and moving said bridging means along said guiding means away from said selected pair of circuit members to a neutral position when rotation of said device terminates, one circuit member of each pair being common to both pairs.

6. A centrifugal circuit controller comprising a device rotatable in either direction about a substantially vertical axis, said device having a curvilinear guide recess substantially tangent to an arc about said axis, three spaced circuit members in said recess, a bridging ball mounted in said recess and having a neutral unbridging position of rest thereagainst out of contact with any of the said circuit members when the device is stationary, the central one of said three circuit members being common to two separate circuits, and the other circuit members respectively being in said respective separate circuits, whereby predetermined rotation of the device in either selected direction moves the ball through inertia from its neutral unbridging position toward a selected pair of said three circuit members and by centrifugal force causes the ball to bridge said selected pair to complete and maintain a selected circuit of said two circuits during rotation in the selected direction and to break the selected circuit by moving to its neutral unbridging position upon the termination of the predetermined rotation.

References Cited in the file of this patent

UNITED STATES PATENTS

| | | |
|---|---|---|
| 1,122,766 | Kinney | Dec. 29, 1914 |
| 1,358,102 | Olds | Nov. 9, 1920 |
| 1,896,798 | Leslie | Feb. 7, 1933 |

FOREIGN PATENTS

| | | |
|---|---|---|
| 175,141 | Switzerland | Aug. 1, 1935 |